US006553300B2

(12) United States Patent
Ma et al.

(10) Patent No.: US 6,553,300 B2
(45) Date of Patent: Apr. 22, 2003

(54) HARVESTER WITH INTELLIGENT HYBRID CONTROL SYSTEM

(75) Inventors: Xinghan Ma, Erie, IL (US); Karl-Heinz Otto Mertins, Davenport, IA (US); Folker Beck, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/906,490

(22) Filed: Jul. 16, 2001

(65) Prior Publication Data

US 2003/0014171 A1 Jan. 16, 2003

(51) Int. Cl.$^7$ .............................. G06F 19/00; G06G 7/00
(52) U.S. Cl. .............................. 701/50; 700/10; 700/34; 700/47–50; 382/156; 56/10.2 F; 56/10.2 H; 56/14.8; 56/16.5; 706/2; 706/904; 706/8; 706/15
(58) Field of Search ............................ 701/50; 700/284, 700/10, 30, 9, 34, 47–50; 382/156, 159, 227; 56/10.2 E, 208, DIG. 15, 10.2 F, 10.2 H, 14.8, 16.5; 239/63, 69, 71; 702/2; 706/1–4, 14–16, 8, 904

(56) References Cited

U.S. PATENT DOCUMENTS

| | | | | |
|---|---|---|---|---|
| 4,296,409 A | | 10/1981 | Whitaker et al. | 340/684 |
| 4,934,985 A | * | 6/1990 | Strubbe | 460/4 |
| 4,967,863 A | * | 11/1990 | Teijido et al. | 180/53.1 |
| 5,535,577 A | * | 7/1996 | Chmielewski et al. | 56/10.2 E |
| 5,586,033 A | * | 12/1996 | Hall | 460/1 |
| 5,613,352 A | * | 3/1997 | Panoushek et al. | 56/10.2 E |
| 5,666,793 A | * | 9/1997 | Bottinger | 460/1 |
| 5,704,200 A | * | 1/1998 | Chmielewski et al. | 56/10.2 E |
| 6,068,059 A | * | 5/2000 | Bajema et al. | 171/130 |
| 6,205,384 B1 | | 3/2001 | Diekhans | 701/50 |

FOREIGN PATENT DOCUMENTS

DE 199 21 466 11/2000

OTHER PUBLICATIONS

Deere & Company, U.S. patent application filed May 4, 2000, Ser. No. 09/564,933 entitled "Arrangement for the Control of the Forward Propulsion Speed of a Harvesting Machine with Fuzzy Logic".

* cited by examiner

Primary Examiner—Thomas G. Black
Assistant Examiner—Ronnie Mancho (57) ABSTRACT

A control system for a harvester or similar implement includes a supervisory controller, a set of low-level controllers and a neuro-fuzzy inference system. The supervisory controller employs human expert knowledge and fuzzy logic. The controller monitors the quality of the harvesting process, such as gain loss, dockage, grain damage and the like. Based on the measurements, setpoints for all critical functional elements of the implement are determined. The neuro-fuzzy inference system determines machine settings according to operating conditions and learns from harvester experience. The parameters of the neuro-fuzzy inference system are stored in on-board memory. The neuro-fuzzy system can be used for harvester set-up and as one of the knowledge sources for repeated adjustments during the harvest.

29 Claims, 7 Drawing Sheets

HARVESTER WITH INTELLIGENT HYBRID CONTROL SYSTEM

FIELD OF THE INVENTION

The present invention relates generally to agricultural implements such as combines and, more specifically, to automatic control of adjustments on such implements.

BACKGROUND OF THE INVENTION

A modern agricultural harvester such as a combine is essentially a factory operating in the field with many interacting and complex adjustments to accommodate continually changing crop, field and machine conditions during harvest. Limited and often imprecise measurements make proper set-up and adjustment of the machine very difficult. Losses from improperly adjusted combines can be substantial, and the quality of the adjustments depends on the skill of the operator. Because the operator usually has to stop the combine, making the necessary adjustments is time-consuming and sometimes ignored so that productivity is compromised.

Despite many years of attempts to control the harvesters automatically, input from skilled operators having much accumulated knowledge is essential for proper adjustment and control of the machines. The operator knowledge is often in a form that cannot be incorporated into conventional control systems.

Examples of previous harvester control systems include those with look-up tables stored in an on-board memory, such as shown and described in U.S. Pat. No. 6,205,384. With such systems, current conditions as a group are compared to groups stored in memory. When current conditions as a group match a stored group (such as high, normal and low), the stored machine settings corresponding to the conditions are used to adjust the machine. New settings can be input by an operator via keyboard. One of the problems with this approach is basically that it is an open-loop approach. Machine settings are determined by historical data stored in the look-up table rather than by control results. As a result, such an open-loop type of system provides no compensation for changes in machine, crop, fields and environments.

Another example of harvester adjustment is shown and described in U.S. Pat. No. 5,586,033 wherein the control system trains a neural network model of the harvester with data. The model is then used to determine harvester settings. Neural nets in large size, however, require a prohibitive computational effort. At the current developmental stage of neural network techniques, large neural nets have limited practical use in harvester applications.

Numerous other harvester adjustment methods and devices have been employed. However, most of the methods attempt to control subsystems of the harvesting process, such as threshing unit control and cleaning fan control, with traditional control approaches. These attempts have, for the most part, been unsuccessful in the marketplace because they fail to take into consideration interactions between the harvesting subsystems.

SUMMARY OF THE INVENTION

It is therefore an object of the present invention to provide an improved control system for an agricultural harvester. It is another object to provide such a system which overcomes most or all of the aforementioned problems.

It is another object of the present invention to provide an improved control system for an agricultural harvester which has the ability to learn and adapt to changing conditions. It is a further object to provide such a system which can compensate for hardware changes, component wear, and crop condition and environment variability.

It is yet another object of the present invention to provide an improved control system for a harvester which has the ability to learn and adapt and to incorporate new machine settings learned from new experience.

It is a further object of the invention to provide an improved learning system for agricultural implements which is particularly useful for applications such as combine control. It is another object to provide such a system having the learning advantages of neural networks but overcoming the limitations of neural networks including the limitation of the huge amount of computational effort required by such networks.

It is another object of the present invention to provide an improved control system for a harvester, which controls the entire machine or process rather than isolated subsystems.

It is a further object to provide an improved control system for a harvester, which can utilize human expert knowledge of the harvesting process.

The intelligent hybrid control system includes a supervisory controller which monitors the quality of the harvesting process, such as grain loss, dockage and grain damage, and, based on the measurements, determines setpoints for all critical functional elements of the harvester. The system also includes a set of conventional low level controllers, and an adaptive neuro-fuzzy inference system which learns and remembers harvest situations. The intelligent hybrid control system combines advantages of human expert knowledge, fuzzy logic and neural nets. The system is able to utilize human expert knowledge, which is invaluable in controlling the complex harvesting process; to work effectively with vague and imprecise information typically provided in a harvester environment; and to learn and adapt automatically to incorporate settings learned from new experience.

Using the system with a combine, all critical elements of the quality of the harvesting process are monitored and controlled. Adjustments to the threshing/separating and cleaning shoe subsystems are made on-the-go to compensate for changing harvest and crop conditions. By using fuzzy logic and neural networks, the control system has the ability to remember past harvest situations in a manner similar to that of a human operator.

The system eliminates the need for constant operator monitoring and regular adjustment and reduces operator fatigue. The machine can operate continuously at performance levels suited to the particular desires of the operator.

These and other objects, features and advantages of the invention will become apparent to one skilled in the art upon reading the following description in view of the drawings.

BRIEF DESCRIPTION OF THE DRAWINGS

FIGS. 5A and 5B show an example of structure for the fuzzy logic controllers.

DESCRIPTION OF THE PREFERRED EMBODIMENTS

Figure 1:
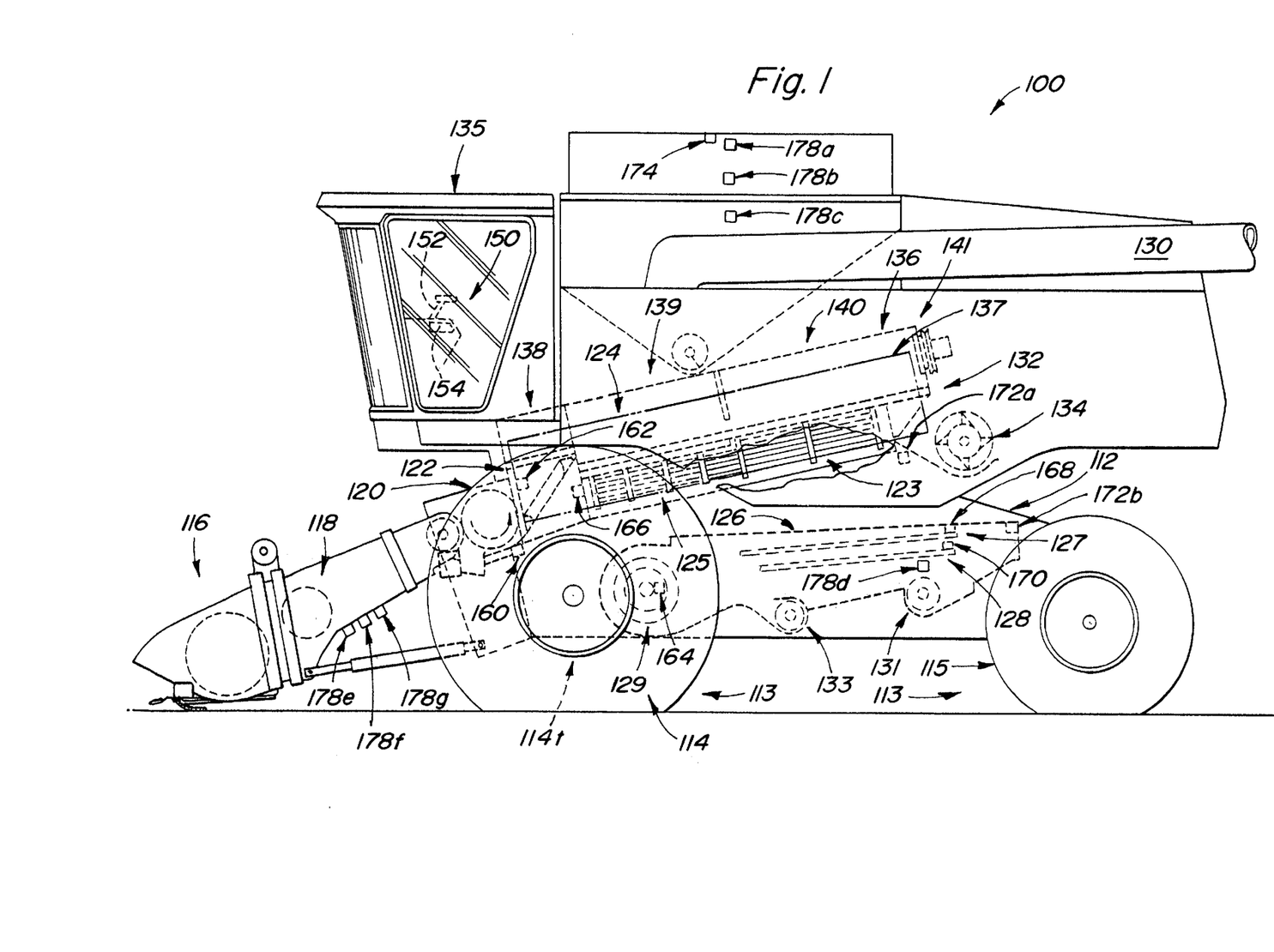
FIG. 1 is a side view of a harvester utilizing the control system of the present invention.

Referring now to FIG. 1, therein is shown an agricultural harvester or combine 100 comprising a main frame 112 having wheel structure 113 including front and rear ground engaging wheels 114 and 115 supporting the main frame for forward movement over a field of crop to be harvested. The front wheels 114 are driven by an electronically controlled hydrostatic transmission 114t.

A vertically adjustable header or harvesting platform 116 is used for harvesting a crop and directing it to a feederhouse 118. The feederhouse 118 is pivotally connected to the frame 112 and includes a conveyor for conveying the harvested crop to a beater 120. The beater 120 directs the crop upwardly through an inlet transition section 122 to a rotary threshing and separating assembly 124. Other orientations and types of threshing structures and other types of headers 116, such as transverse frame supporting individual row units, could also be utilized.

The rotary threshing and separating assembly 124 threshes and separates the harvested crop material. Grain and chaff fall through a concave 125 and separation grates 123 on the bottom of the assembly 124 to a cleaning system 126, and are cleaned by a chaffer 127 and a sieve 128 and air fan 129. The cleaning system 126 removes the chaff and directs the clean grain to a clean grain tank by a grain auger 133. The clean grain in the tank can be unloaded into a grain cart or truck by unloading auger 130. Tailings fall into the returns auger 131 and are conveyed to the rotor 37 where they are threshed a second time.

Threshed and separated straw is discharged from the axial crop processing unit through an outlet 132 to a discharge beater 134. The discharge beater 134 in turn propels the straw out the rear of the combine. It should be noted that the discharge beater 134 could also discharge crop material other than grain directly to a straw chopper. The operation of the combine is controlled from an operator's cab 135.

The rotary threshing and separating assembly 124 comprises a cylindrical rotor housing 136 and a rotor 137 located inside the housing 136. The front part of the rotor and the rotor housing define the infeed section 138. Downstream from the infeed section 138 are the threshing section 139, the separating section 140 and the discharge section 141. The rotor 137 in the infeed section 138 is provided with a conical rotor drum having helical infeed elements for engaging harvested crop material received from the beater 120 and inlet transition section 122. Immediately downstream from the infeed section 138 is the threshing section 139.

In the threshing section 139 the rotor 137 comprises a cylindrical rotor drum having a number of threshing elements for threshing the harvested crop material received from the infeed section 138. Downstream from the threshing section 139 is the separating section 140 wherein the grain trapped in the threshed crop material is released and falls to the cleaning system 128. The separating section 140 merges into a discharge section 141 where crop material other than grain is expelled from the rotary threshing and separating assembly 124.

An operator's console 150 located in the cab 135 includes conventional operator controls including a hydro shift lever 152 for manually controlling the speed range and output speed of the hydrostatic transmission 114t. An operator interface device 154 in the cab 135 facilitates entry of information into an on-board processor system, indicated generally at 155, which provides automatic speed control and numerous other control functions described below for the harvester 100. Readouts from on-board sensors 157 and microcontrollers 158 are provided by the device 154. The operator can enter various types of information via input line 154a of the device 154, including crop type, location, yield, and acceptable grain loss, damage and dockage and the like.

Signals from the sensors 157 include information on environmental variables such as relative humidity, and information on variables controlled by the on-board processor system. Signals include vehicle speed signals from a radar sensor or other conventional ground speed transducer 160, rotor and fan speed signals from transducers 162 and 164, and concave clearance and chaffer and sieve opening signals from transducers 166, 168 and 170, respectively. Additional signals originate from a grain loss sensor 172a and left- and right-hand grain loss sensors 172b, a grain damage sensor 174 and various other sensor devices on the harvester. Signals from a tank cleanliness sensor 178a, a mass flow sensor 178b, a grain moisture sensor 178c, a trailings volume sensor 178d, and relative humidity, temperature and material moisture sensors 178e, 178f and 178g are also provided.

CAN bus 180 (FIG. 2) directs signals from a grain moisture microcontroller 182, an engine speed monitor 184, a grain mass flow monitor 186, and other microcontrollers 188 on the harvester to an automatically adjustable controller 200. Signals from the operator interface 154 and the harvester sensors 157 are also directed to the controller 200.

Figure 2:
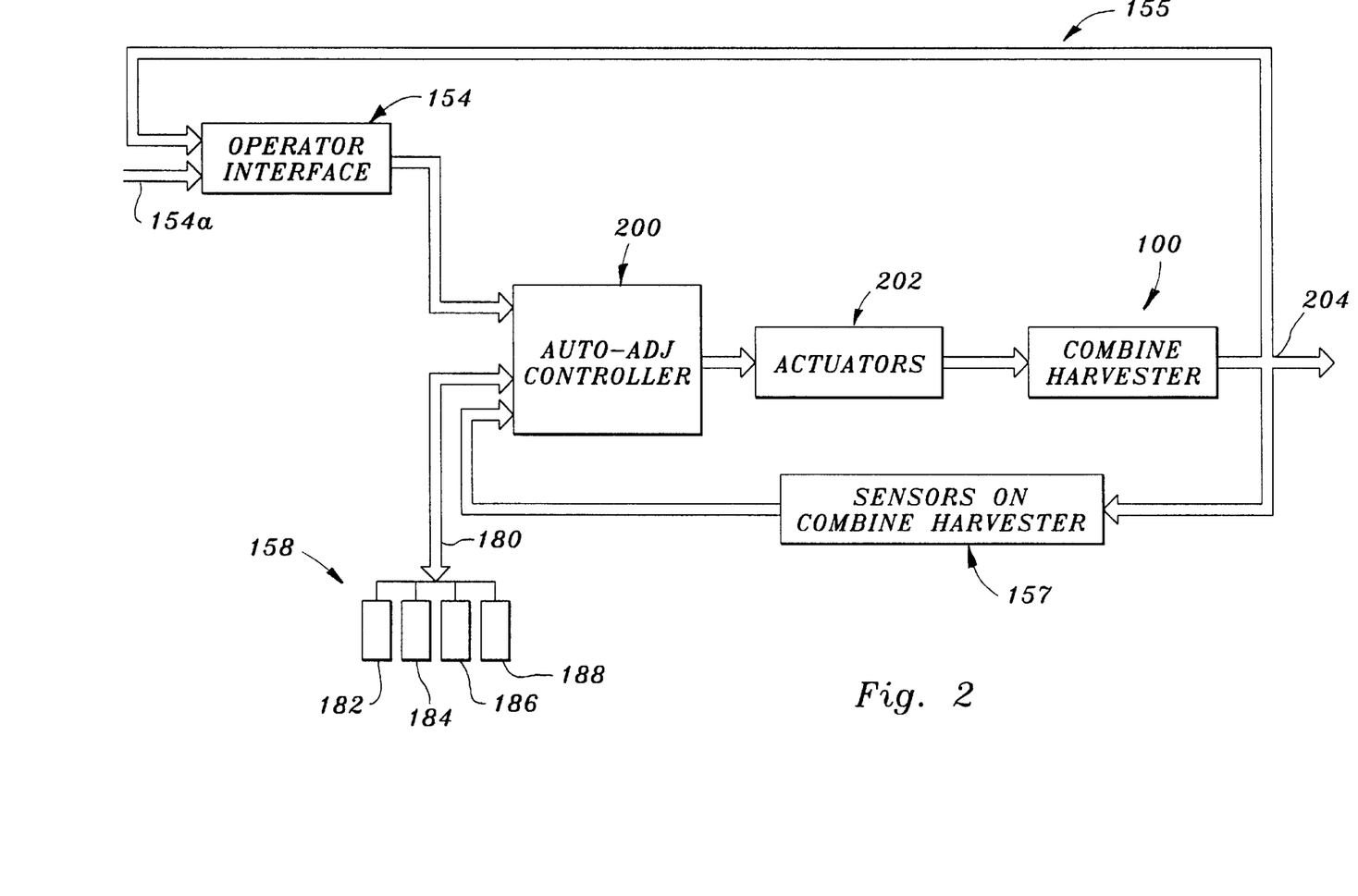
FIG. 2 is a schematic diagram for the control system.

The automatically adjustable controller 200 is connected to actuators 202 for controlling adjustable output devices on the implement. Feedback and input signals are input to the controller 200 via line 204, the sensors, and the interface 154. Display and machine condition information is input to the interface 154 via line 204.

The controller 200 includes an adaptive neuro-fuzzy inference system 210 (FIG. 3), a supervisory controller 212 and a set of low level controllers 214. The supervisory controller 212 monitors the quality of the harvesting process, such as grain loss, dockage and grain damage and the like. Based on the measurements, setpoints for all critical functional elements of the implement are determined by the controller. When the supervisory controller 212 learns a new set of settings to remember, a save signal is sent via line 220 and the system 210 adapts the inference system to incorporate the new situation. The parameters of the system 210 are stored in on-board memory. An inquiry signal is sent via line 222 when the supervisory controller 212 asks for settings from the system 210. The set of low level controllers 214 for a combine (FIG. 3) include a rotor speed controller 214a, a concave clearance controller 214b, a fan speed controller 214c, a chaffer opening controller 214d, a sieve opening controller 214e and a vehicle speed controller 214f. The outputs of the controllers 214a–214f comprise control signals for controlling corresponding actuators 202 for rotor speed, concave clearance, fan speed, chaffer and sieve openings, and vehicle speed.

The supervisory controller 212 (FIG. 4) includes a selector 240 which monitors the quality of the harvesting process such as grain loss, dockage and grain damage. Based on the measurements, a set of fuzzy controllers 244 determine adjustments of the setpoints for all critical functional elements of the combine. The fuzzy controllers 244a–244f provide adjustment information for: a) rotor speed; b) concave clearance; c) fan speed; d) chaffer opening; e) sieve opening; and f) vehicle speed, respectively. A setpoint calculator 250 receives the adjustment information from the controllers 244 and determines setpoints for all the controlled variables. The setpoints are sent to the corresponding low level controllers 214a–214f (FIG. 3) to achieve the desired optimized machine output.

Figure 5A:
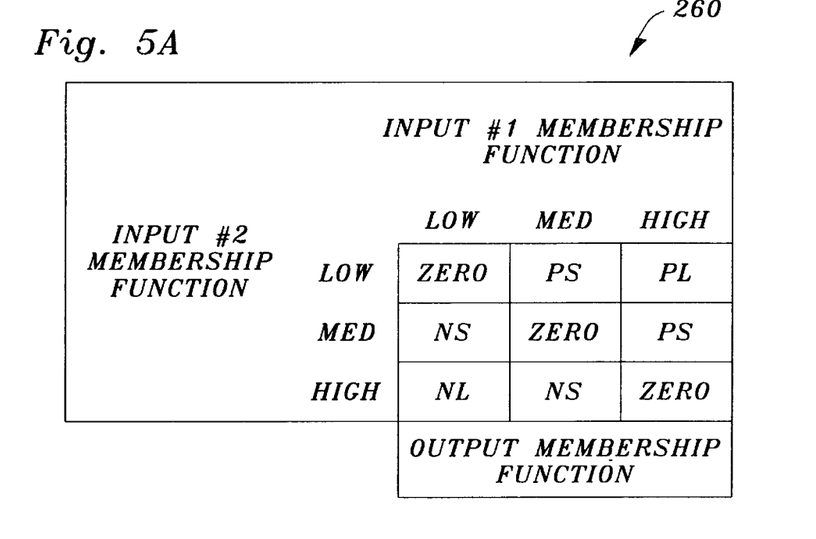
FIG. 5A shows a rule base for a fuzzy controller with two inputs.
Figure 5B:
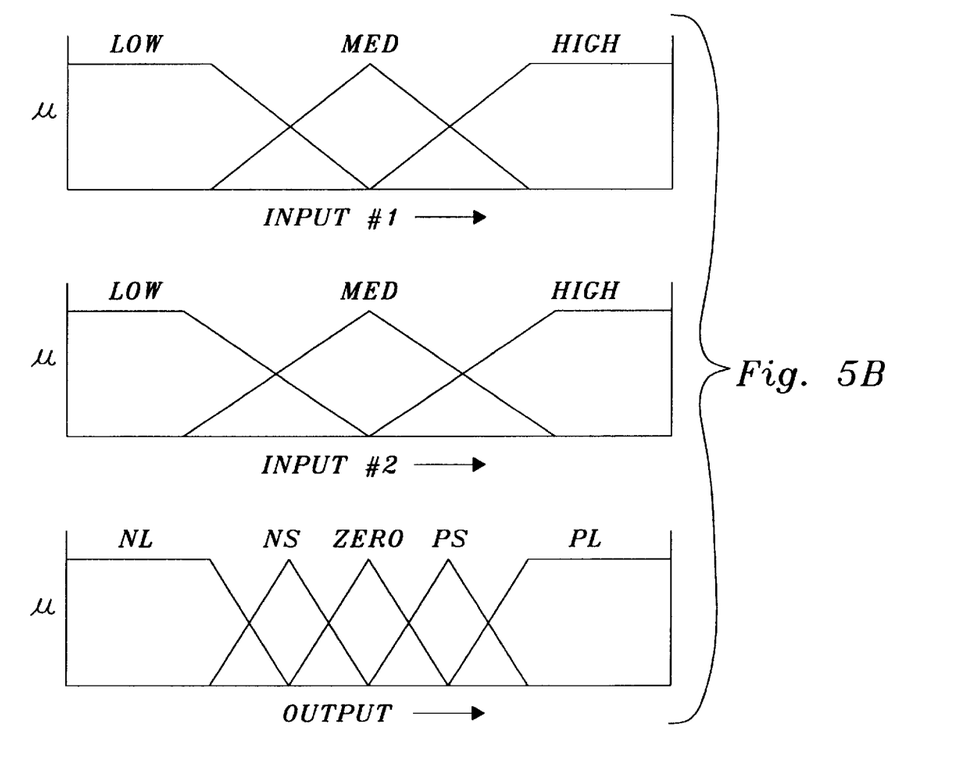
FIG. 5B shows membership functions for the inputs/output parameters.

An example of the structure for the fuzzy logic controllers 244 is shown in FIGS. 5A and 5B. A rule base 260 with two inputs is selected in FIG. 5A. The rule base 260 includes nine rules. Each fuzzy rule, or basic component for capturing knowledge, has an if-component and a then-component. For the example shown, if input one and input two are the same (low, medium or high), then the output is zero. A negative large output (NL) is provided only if input one is low and output two, is high. A positive large output (PL) is provided only if input one is high and input two is low. Positive small (PS) and negative small (NS) outputs are provided when only one of the inputs is medium.

FIG. 5B shows membership functions for the inputs/output parameters. The membership functions map inputs and output to their membership values. The membership functions can be decided by knowledge and later adjusted based on a tuning strategy, or by other means such as neural networks.

The algorithm for each fuzzy rule based controller 244a–244f consists of four steps:
1. Fuzzy matching (fuzzification): calculate the degree to which the input data match the condition of the fuzzy rules;
2. Inference: calculate the conclusion of the rule based on the degree of match;
3. Combination: combine the conclusion inferred by all fuzzy rules into a final conclusion; and
4. Defuzzification: convert a fuzzy conclusion into a crisp one.

The system 210 (FIG. 6) is shown using one neuro-fuzzy inference system 270 with six outputs a–f. The system 270 can have a single neuro-fuzzy inference system with six outputs or six single-output neuro-fuzzy inferences systems. Inputs to the system 270 include harvesting conditions and crop properties (such as crop type, location, and grain yield) from the operator interface 154 and information from the on-board sensors 157 and microcontrollers 158.

Figure 3:
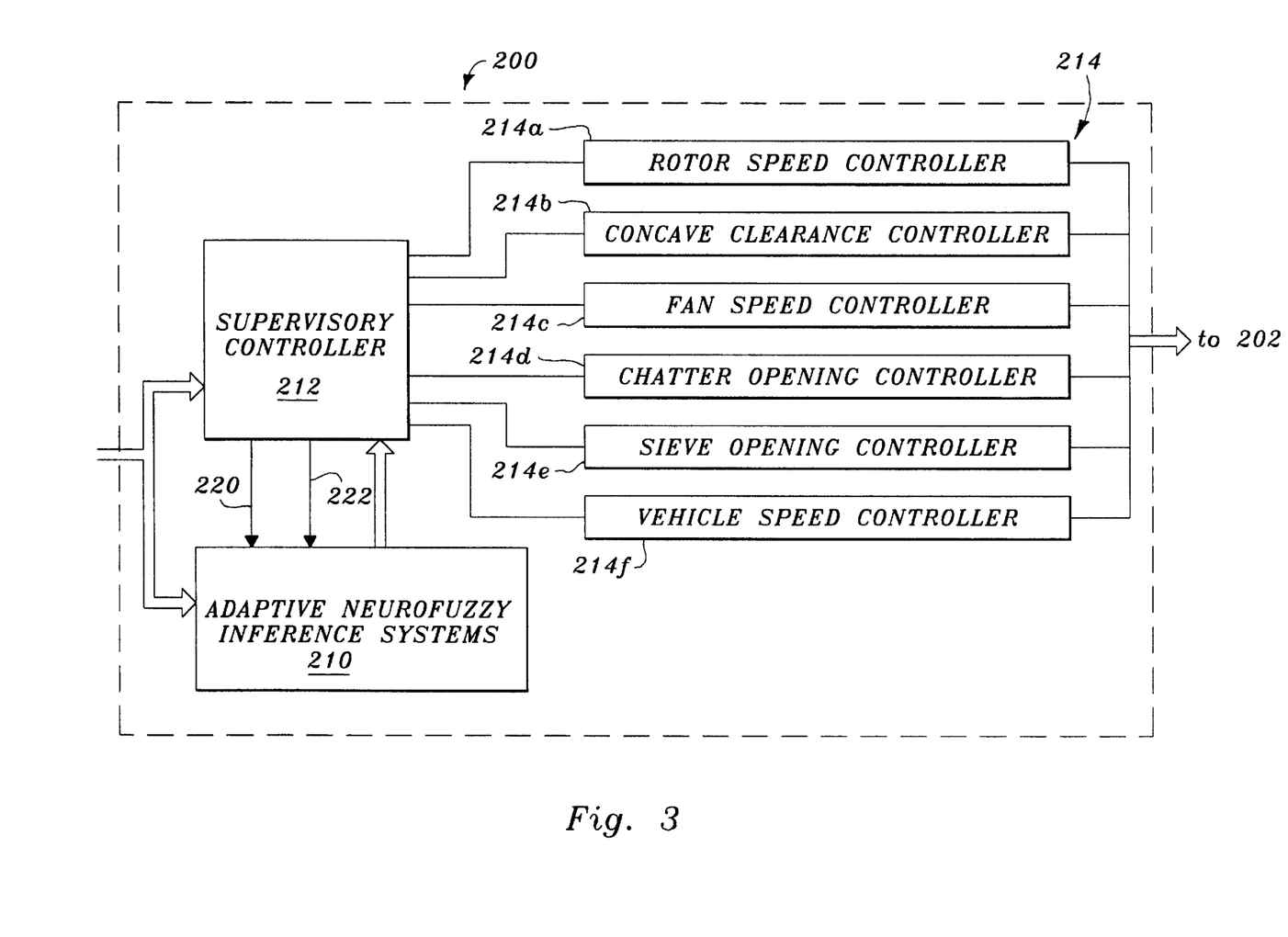
FIG. 3 is a schematic diagram for the intelligent controller.
Figure 4:
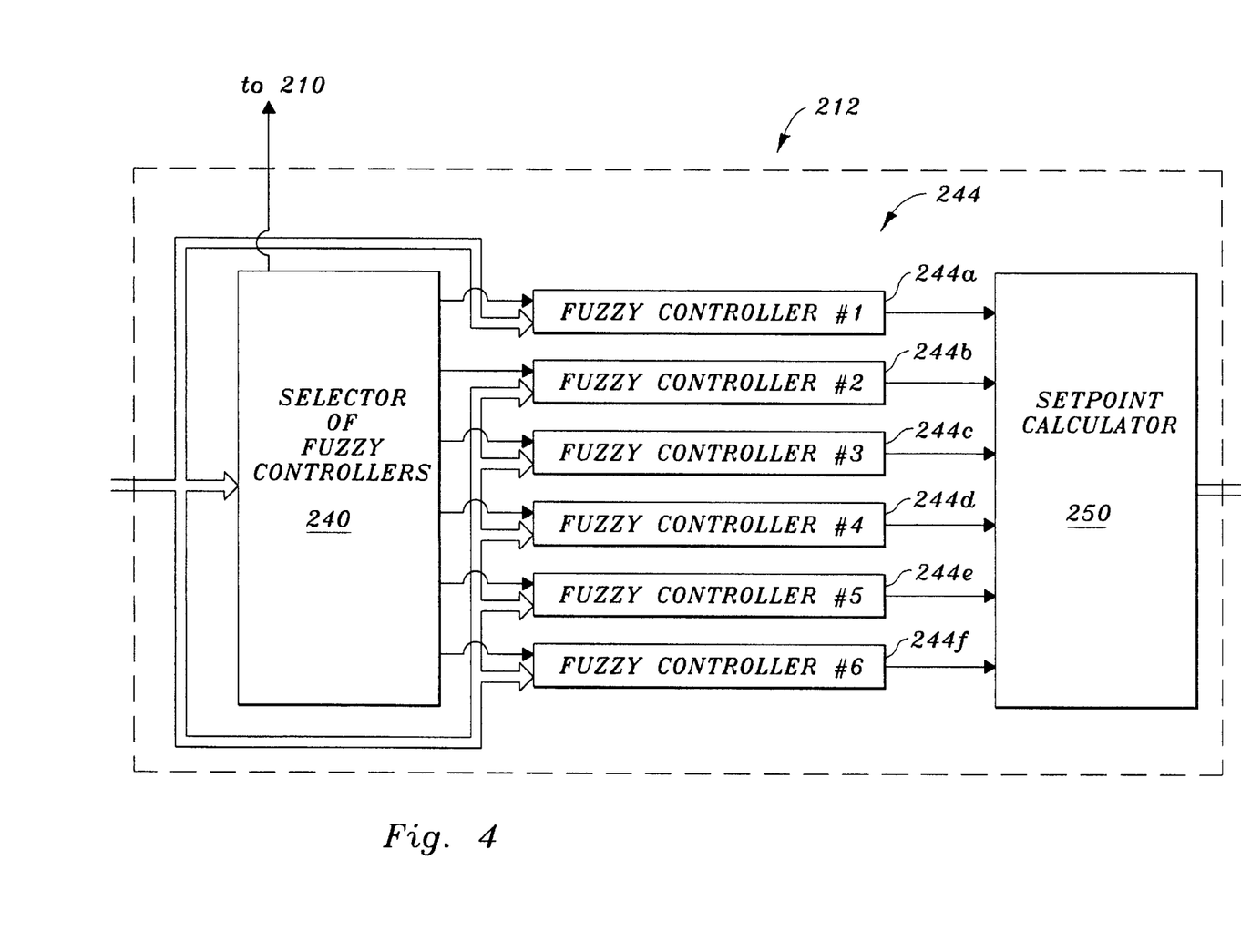
FIG. 4 is a schematic of the supervisory controller for the controller of FIG. 3.
Figure 6:
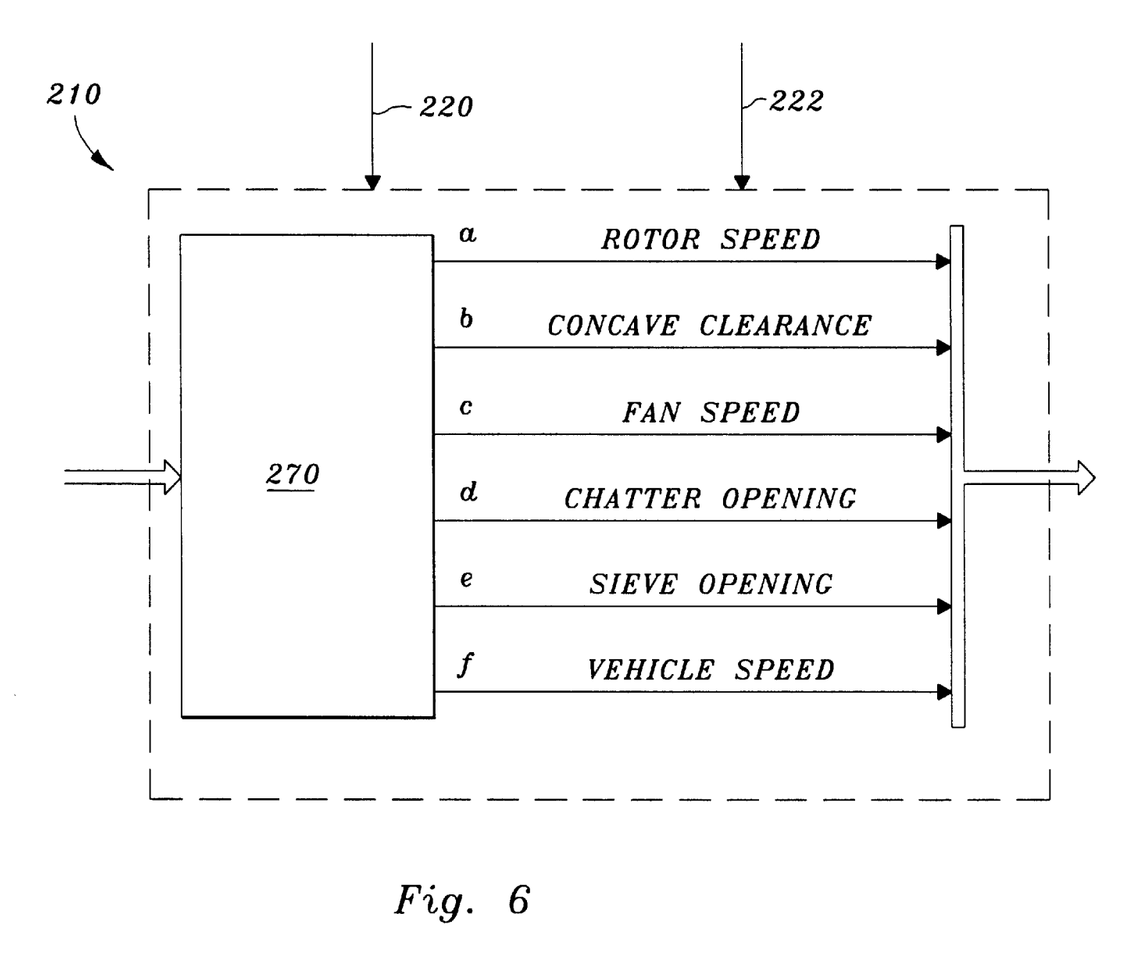
FIG. 6 shows the adaptive fuzzy inference systems.

The system 210 is an adaptive neuro-fuzzy inference system which essentially functions as a fuzzy inference system but has additional learning ability from neural networks. Newly learned harvester experience is automatically integrated into the inference system. As pointed out previously, when the supervisory controller 212 learns a new set of settings to remember, a signal is sent via line 220 to the system 210 which then adapts the inference system to incorporate the new situation. The controller 212 sends an inquiring signal via line 222 when asking for the settings from the system 210.

The controller 200 provides closed-loop control. In addition, the controller 200 has the ability to learn and adapt the neuro-fuzzy inference system.

Figure 7:
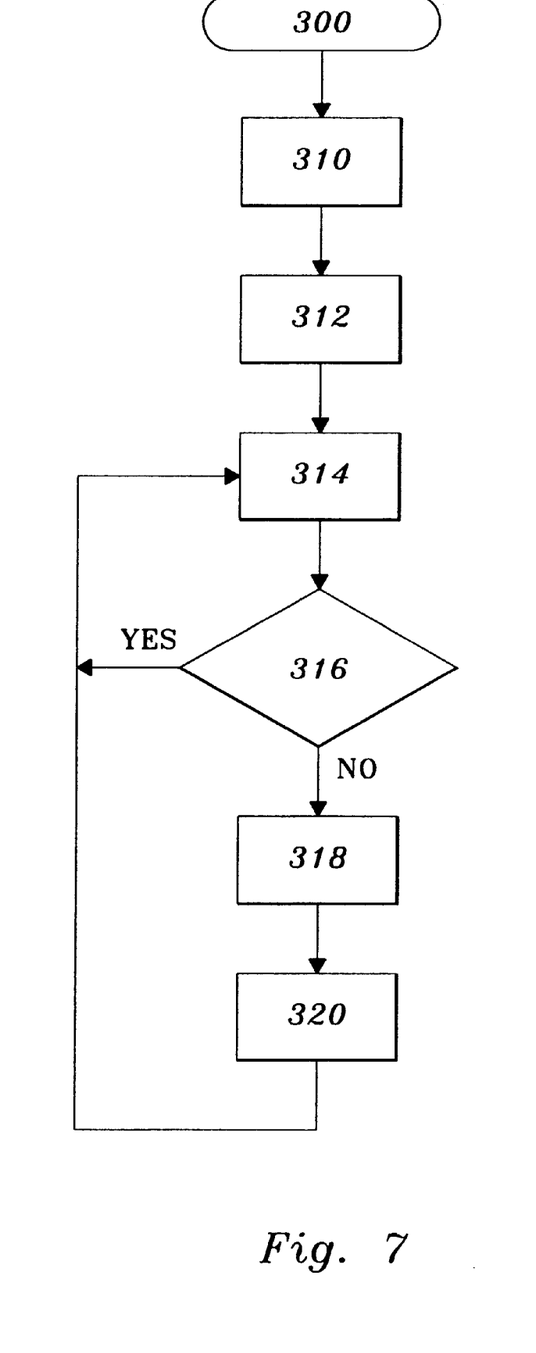
FIG. 7 is a flow chart for adjusting the harvester in accordance with the methods of the present invention.

FIG. 7 shows a flow chart for harvester adjustment by the processor using the structure and methods described above. Upon initiation of the routine at 300, crop and harvest strategy information is entered at 310. Initial settings for the implement set-up are applied at 312. The initial settings can be based on harvest history, weather conditions, crop properties and the like and are stored in the on-board memory. The process is monitored at 314 as outputs from the feedback transducers and control sensors, microcontrollers and operator interface are polled. If the process variables and parameters are all within preselected target ranges at 316, the process is again monitored at 314. If one or more of the target ranges are not satisfied at 316, the processor determines a procedure that a highly experienced operator would follow to adjust the actuators to move the subject process variables/parameters towards the target ranges at 318. At 320, the processor determines how much to adjust and sends control signals to the actuators.

Having described the preferred embodiment, it will become apparent that various modifications can be made without departing from the scope of the invention as defined in the accompanying claims. Although the harvester is shown as a combine, the system described above is also suitable for use with other harvesters as well as other implements having interacting and complex adjustments to accommodate various types of continually changing operating conditions. The system described is particularly adaptable, for example, to many agricultural and construction implements wherein sensor and feedback information is relatively imprecise.

We claim:

1. A control system for controlling an agricultural harvesting implement operable in varying operating conditions and having a plurality of adjustable output devices including two or more of the following output devices affecting harvesting implement cleaning and separation operations: a rotor with adjustable speed, a concave with an adjustable opening, a sieve with an adjustable sieve opening, a chaffer with an adjustable chaffer opening, and a fan with adjustable fan speed, the control system comprising:
   a plurality of actuators connected to the output devices;
   feedback devices providing feedback signals indicative of the adjustments of the output devices;
   a plurality of sensors providing input signals indicative of implement input condition and controlled variables;
   a controller connected to the actuators and responsive to the feedback signals and the input signals for automatically controlling at least two of the output devices; and
   wherein the controller includes a neuro-fuzzy inference system that learns and stores parameters from implement experience, the inference system thereby providing a knowledge source to the control system to vary control of at least two or more of the cleaning and separating output devices to improve implement performance based upon past implement experience.

2. The control system as set forth in claim 1 wherein the control system includes a closed-loop supervisory control system continually adjusting a preferred response to the signals to improve cleaning and separating operations.

3. The control system as set forth in claim 1 wherein the control system includes human expert knowledge, fuzzy logic and neural nets, and defines an intelligent hybrid control system.

4. The system as set forth in claim 3 wherein the signals from the feedback devices and the sensors includes imprecise data, wherein the intelligent hybrid control system works effectively with the imprecise data.

5. The system as set forth in claim 4 wherein the inference system is used for implement set-up so that set-up is responsive to prior implement performance.

6. The system as set forth in claim 4 wherein the implement includes initial input structure with operator interface for inputting initial controller setting information to the processor.

7. The system as set forth in claim 6 wherein at least a portion of the initial controller setting information is based on the past implement experience.

8. The system as set forth in claim 6 wherein the initial input structure includes a neuro-fuzzy interface for inputting information on one or more of the following: weather conditions; crop properties; harvest conditions; acceptable crop loss; and acceptable crop damage.

9. The system as set forth in claim 1 wherein the implement comprises a combine and the control of the output devices includes control of at least one of: rotor speed and concave opening; and at least one of: sieve opening, chaffer opening, and fan speed on-the-go.

10. The system as set forth in claim 1 wherein the feedback devices provide feedback information to the controller on conditions of crop, environment, machine and adjustments, wherein the controller is responsive to the feedback information to automatically adjust the controller response to vary control of the output devices in response to the conditions.

11. A control system for controlling an agricultural harvesting implement operable in varying operating conditions and having a plurality of adjustable output devices including an adjustable threshing device and an adjustable crop cleaning device affecting implement output, the control system comprising:

a plurality of actuators connected to the output devices;

a plurality of sensors providing implement input condition signals;

control sensors for providing implement output performance information;

an automatically adjustable controller connected to the actuators and responsive to the input condition signals for automatically controlling the threshing device and the crop cleaning device; and wherein the automatically adjustable controller comprises an adaptive neuro-fuzzy inference system, and a supervisory controller connected to the actuators and the neuro-fuzzy inference system, wherein the neuro-fuzzy inference system learns implement operation and adapts automatic control of the output devices to the learned implement operation to optimize implement output.

12. The control system as set forth in claim 11 wherein the implement comprises a combine, and the actuators include two or more of the following: a rotor speed controller; a concave clearance controller; a fan speed controller; a chaffer opening controller; a sieve opening controller and an implement speed controller.

13. The control system as set forth in claim 11 wherein the control system includes human expert knowledge, fuzzy logic and neural nets, and defines an intelligent hybrid control system.

14. The system as set forth in claim 13 wherein the signals from the sensors includes one or more imprecise signals, wherein the intelligent hybrid control system works effectively with the imprecise signals.

15. The system as set forth in claim 11 wherein the controller remembers learned implement operation and utilizes the learned implement operation as a source of knowledge for implement set-up.

16. The system as set forth in claim 15 wherein the implement includes initial input structure for inputting initial implement setting information to the controller, at least a portion of the initial controller setting information based on the learned implement operation.

17. The system as set forth in claim 11 wherein the supervisory controller comprises a plurality of fuzzy controllers, a fuzzy controller selector, and a setpoint calculator.

18. The system as set forth in claim 12 wherein the combine includes initial input structure for inputting initial implement setting information to the processor, the initial input structure including means for inputting information on one or more of the following: weather conditions; crop properties; harvest conditions; acceptable crop loss; and acceptable crop damage.

19. The system as set forth in claim 12 wherein the threshing device comprises an adjustable speed rotor and the cleaning device comprises a sieve with an adjustable opening, and wherein the automatic control includes on-the-go adjustments of the rotor speed and the sieve opening.

20. The system as set forth in claim 11 including feedback control sensors connected to the output devices and providing feedback signals to the controller indicative of changes in crop, fields, implement hardware, and performances of the adjustable controller.

21. A control system for controlling a combine operable in varying operating harvesting conditions and having a plurality of adjustable output devices affecting implement output, the control system comprising:

a plurality of actuators connected to the output devices;

feedback control sensors providing machine performance feedback signals;

a plurality of sensors providing implement input condition signals;

an automatically adjustable controller connected to the actuators and responsive to the input condition signals and the feedback signals for automatically controlling the output devices on-the-go during harvesting;

an operator interface connected to the automatically adjustable controller for entering adjustment information;

wherein the automatically adjustable controller comprises an adaptive neuro-fuzzy inference system for receiving the signals and learning operating conditions, a supervisory controller connected to the actuators and the neuro-fuzzy inference system, the supervisory controller including a selector responsive to input condition signals and the adjustment information for facilitating determination of the control of the output devices, and fuzzy controller structure connected to the selector and providing quantitative information for output device control; and wherein the fuzzy controller structure includes fuzzy controllers providing adjustment information for two or more controlled combine variables from the following list of variables:

a) rotor speed;
b) concave clearance;
c) fan speed;
d) chaffer opening;
e) sieve opening; and
f) combine speed.

22. The control system as set forth in claim 21 wherein the supervisory controller learns sets of device settings to remember and directs the adaptive neuro-fuzzy inference system to incorporate the sets of device settings as initial settings and as a knowledge source for control.

23. The control system as set forth in claim 22 including an inquiry line connecting the supervisory controller and the adaptive neuro-fuzzy inference system, and wherein the supervisory controller sends an inquiring signal via the inquiry line asking for the settings for use as the initial settings and as a knowledge source for control.

24. The control system as set forth in claim 21 wherein the supervisory controller includes a setpoint calculator connected to the fuzzy controller and to the actuators.

25. The control system as set forth in claim 21 wherein the fuzzy controller structure comprises fuzzy controllers providing adjustment information for one or more controlled combine variables from the following list of variables:
   a) the rotor speed;
   b) the concave clearance;
   c) the fan speed; and
   one or more variables from the following list of variables:
   d) the chaffer opening; and
   e) the sieve opening.

26. The control system as set forth in claim 25 including a setpoint calculator connected to the fuzzy controllers and determining adjustment setpoints for the controlled variables.

27. The control system as set forth in claim 26 wherein the setpoint calculator communicates with low level controllers to achieve combine output control, the low level controllers including:
   a) a rotor speed controller;
   b) a concave clearance controller;
   c) a fan speed controller;
   d) a chaffer opening controller;
   e) a sieve opening controller; and
   f) a combine speed controller.

28. The control system as set forth in claim 21 including feedback devices connected to the-output devices and providing feedback signals to the automatically adjustable controller, and wherein the fuzzy controller structure provides adjustment information for all of the following variables:
   a) rotor speed;
   b) concave clearance;
   c) fan speed;
   d) chaffer opening;
   e) sieve opening; and
   f) combine speed.

29. The control system as set forth in claim 28 wherein the controlled variables comprise grain loss, dockage and grain damage.

* * * * *